(12) United States Patent
Akama et al.

(10) Patent No.: US 10,793,149 B2
(45) Date of Patent: Oct. 6, 2020

(54) CONTROL APPARATUS, CONTROL METHOD, AND PROGRAM

(71) Applicant: Sony Corporation, Tokyo (JP)

(72) Inventors: Taketo Akama, Tokyo (JP); Suguru Aoki, Tokyo (JP); Hideki Oyaizu, Tokyo (JP); Yasutaka Hirasawa, Tokyo (JP); Yuhi Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 15/761,901

(22) PCT Filed: Sep. 5, 2016

(86) PCT No.: PCT/JP2016/004043
§ 371 (c)(1),
(2) Date: Mar. 21, 2018

(87) PCT Pub. No.: WO2017/056401
PCT Pub. Date: Apr. 6, 2017

(65) Prior Publication Data
US 2018/0229725 A1    Aug. 16, 2018

(30) Foreign Application Priority Data

Sep. 30, 2015    (JP) .................. 2015-193320

(51) Int. Cl.
*B60W 30/095* (2012.01)
*B60R 11/04* (2006.01)
(Continued)

(52) U.S. Cl.
CPC ......... *B60W 30/0956* (2013.01); *B60R 11/04* (2013.01); *B60W 40/00* (2013.01);
(Continued)

(58) Field of Classification Search
CPC .. B60W 30/0956; B60W 40/00; B60W 40/04; B60R 11/04; B60R 2300/103;
(Continued)

(56) References Cited

U.S. PATENT DOCUMENTS

| 2013/0226408 | A1* | 8/2013 | Fung | .................. G08G 1/167 |
| | | | | 701/41 |
| 2015/0154461 | A1* | 6/2015 | Kitaura | .............. G06K 9/00845 |
| | | | | 348/148 |
| 2017/0374325 | A1* | 12/2017 | Itoh | ...................... G02B 3/0056 |

FOREIGN PATENT DOCUMENTS

| JP | 2009-211309 A | 9/2009 |
| JP | 2010-095187 A | 4/2010 |

OTHER PUBLICATIONS

Sato, JP 2010095187, Apr. 30, 2010 (machine translation).*
(Continued)

*Primary Examiner* — Courtney D Heinle
(74) *Attorney, Agent, or Firm* — Wolf, Greenfield & Sacks, P.C.

(57) ABSTRACT

A control apparatus includes an input unit and a control unit. To the input unit, a pickup image of a camera provided to an own vehicle is input. The control unit detects a mirror provided to a different vehicle that exists in front of the own vehicle from the input pickup image, detects a person from a mirror image of the detected mirror, and recognizes a state of the person from an image of the detected person. Further, the control unit performs an alerting process or a control process for the own vehicle to prevent an accident of the own vehicle or the different vehicle in accordance with the recognized state of the person.

14 Claims, 10 Drawing Sheets

A

B

(51) Int. Cl.
*B60W 40/00* (2006.01)
*B60W 40/04* (2006.01)
*G06K 9/00* (2006.01)
*G08G 1/16* (2006.01)

(52) U.S. Cl.
CPC ......... *B60W 40/04* (2013.01); *G06K 9/00281* (2013.01); *G06K 9/00335* (2013.01); *G06K 9/00825* (2013.01); *G06K 9/00845* (2013.01); *G08G 1/16* (2013.01); *B60R 2300/103* (2013.01); *B60R 2300/107* (2013.01)

(58) Field of Classification Search
CPC .......... B60R 2300/107; G06K 9/00281; G06K 9/00335; G06K 9/00825; G06K 9/00845; G08G 1/16
See application file for complete search history.

(56) References Cited

OTHER PUBLICATIONS

Written Opinion and English translation thereof dated Sep. 27, 2016 in connection with International Application No. PCT/JP2016/004043.

International Preliminary Report on Patentability and English translation thereof dated Apr. 12, 2018 in connection with International Application No. PCT/JP2016/004043.

International Search Report and English translation thereof dated Sep. 27, 2016 in connection with International Application No. PCT/JP2016/004043.

* cited by examiner

A

B

CONTROL APPARATUS, CONTROL METHOD, AND PROGRAM

CROSS REFERENCE TO RELATED APPLICATIONS

This is a U.S. National Stage Application under 35 U.S.C. § 371, based on International Application No. PCT/JP2016/004043, filed in the Japanese Patent Office as a Receiving Office on Sep. 5, 2016, entitled "CONTROL DEVICE, CONTROL METHOD, AND PROGRAM", which claims priority under 35 U.S.C. § 119(a)-(d) or 35 U.S.C. § 365(b) to Japanese Patent Application Number JP2015-193320, filed in the Japanese Patent Office on Sep. 30, 2015, each of which applications is hereby incorporated by reference in its entirety.

TECHNICAL FIELD

The present technology relates to a control apparatus capable of performing a process for preventing a vehicle accident from occurring and a control method and a program for the control apparatus.

BACKGROUND ART

From the past, a technology of performing a process for preventing a vehicle accident from occurring is known. Patent Literature 1 describes the following. Side mirrors of a different vehicle are detected. In a case where a head portion of a driver of the different vehicle is detected from a mirror image of the side mirrors, it is determined that an own vehicle exists outside a blind area of the different vehicle. In a case where the head portion of the driver of the different vehicle is not detected, it is determined that the own vehicle exists in the blind area of the different vehicle. In a case where the own vehicle exists in the blind area, the fact is notified to an occupant of the own vehicle.

CITATION LIST

Patent Literature

Patent Literature 1: Japanese Patent Application Laid-open No. 2009-211309

DISCLOSURE OF INVENTION

Technical Problem

However, by the technology described in Patent Literature 1, only whether the head portion of the person is detected from a mirror image from the side mirrors is grasped. Accordingly, it is unclear whether the driver of the different vehicle actually recognizes the own vehicle, even when the own vehicle exists outside the blind area of the different vehicle. Thus, by the technology described in Patent Literature 1, in a case where the driver of the different vehicle does not recognize the own vehicle, an accident of the own vehicle and the different vehicle may occur.

In view of the circumstances as described above, an object of the present technology is to provide a control apparatus capable of preventing an accident of an own vehicle or a different vehicle from occurring by recognizing a state of an occupant of the different vehicle and performing a process according to the state, and a control method and a program for the control apparatus.

Solution to Problem

According to an embodiment of the present technology, a control apparatus includes an input unit and a control unit. To the input unit, a pickup image of a camera provided to an own vehicle is input. The control unit detects a mirror provided to a different vehicle that exists in front of the own vehicle from the input pickup image, detects a person from a mirror image of the detected mirror, and recognizes a state of the person from an image of the detected person. Further, the control unit performs an alerting process or a control process for the own vehicle to prevent an accident of the own vehicle or the different vehicle in accordance with the recognized state of the person.

As a result, the control apparatus can prevent an accident of the own vehicle or the different vehicle by recognizing the state of an occupant of the different vehicle and performing the process according to the state.

The control unit may recognize a part of a body of the person from the image of the detected person in the mirror image, recognize a component of the different vehicle from an image excluding the person in the mirror image, and recognize the state of the detected person on a basis of a relationship between the recognized part of the body and the recognized component.

As a result, the control apparatus can recognize, from the mirror image, the part of the body of the person and the component (for example, steering wheel, seat, seat belt, or the like) of the different vehicle, and recognize the state of the person on a basis of the relationship between the part of the body and component.

The control unit may recognize a state of the different vehicle from an image excluding the mirror in the input pickup image, and estimate a behavior of the person on a basis of the recognized state of the person and the state of the different vehicle.

As a result, the control apparatus recognizes the state (for example, a blinker, a speed, a direction of a vehicle body, or the like) of the different vehicle, and integrates the state with the state of the person, with the result that it is possible to estimate a behavior to be performed by the person.

The control unit may determine whether the detected person is a driver or not on a basis of the relationship between the recognized part of the body and the recognized component.

As a result, in a case where a plurality of persons is detected from the mirror image, the control apparatus can specify the driver from the persons and recognize the state of the driver.

The control apparatus may further include a storage unit that stores driver's seat information relating to a position of a driver's seat for each vehicle model. In this case, the control unit may recognize a vehicle model of the different vehicle from the pickup image, and estimate a position of a driver of the different vehicle on a basis of the recognized vehicle model and the stored driver's seat information.

As a result, even in a case where the plurality of persons is detected from the mirror image, the control apparatus can estimate the position of the driver of the different vehicle on a basis of the vehicle model of the different vehicle and the driver's seat information thereof.

In a case where it is detected from the pickup image that the different vehicle exists on a traffic lane different from the own vehicle, the control unit may detect an outer rearview mirror provided to the different vehicle, and in a case where it is detected from the pickup image that the different vehicle exists on a same traffic lane as the own vehicle, the control unit may detect an inner rearview mirror provided to the different vehicle.

As a result, the control apparatus can appropriately recognize the state of the person of the different vehicle by switching the mirror to be focused in the different vehicle depending on whether the different vehicle in front exists on the same traffic lane as the own vehicle or a different traffic lane therefrom. The outer rearview mirror is a mirror provided outside of the vehicle such as a fender mirror and a door mirror (side mirror), and the inner rearview mirror is a mirror provided inside the vehicle.

The control unit may control an infrared light emission unit provided to the own vehicle to irradiate the mirror detected at night with infrared light.

As a result, the control apparatus irradiates the mirror with infrared light at night, thereby making it possible to obtain the mirror image robustly and recognize the state of the person from the mirror image even at night. The control unit may determine whether of night or day from lightness of the pickup image or from a current time.

The control unit may recognize the state of the person on a basis of the pickup image from which a reflection component caused due to window glass of the different vehicle is removed, the pickup image being input through a polarization camera provided to the own vehicle.

As a result, the control apparatus can recognize the state of the person of the different vehicle with high accuracy on a basis of the pickup image from which the noise due to the reflection on the window glass. Specifically, the polarization camera can remove the reflection component of the front door glass of the different vehicle from the mirror image of the outer rearview mirror of the different vehicle, and can remove the reflection component of the rear window of the different vehicle from the inner rearview mirror of the different vehicle.

In a case where the control unit detects that the different vehicle is in a stopped state from the pickup image, and detects that the person lays a hand on a door from a relationship between an image of the door in the mirror image and an image of the hand of the person, the control unit may alert a driver of the own vehicle that the person gets out of the different vehicle, or perform an alerting process of alerting a driver of the different vehicle of an approach by the own vehicle.

As a result, the control apparatus can detect that the person gets out of the different vehicle during a stop of the different vehicle, and put out an alert of danger associated therewith.

In a case where the control unit detects that a state in which eyelids of the detected driver are closed for a first period or more occurs by a predetermined frequency or more, and a state in which a head portion of the driver is directed downward at a predetermined angle or more continues for a second period or more, the control unit may alert a driver of the own vehicle that the driver of the different vehicle is drowsing, or perform an alerting process of putting out an alert to the driver of the different vehicle.

As a result, the control apparatus can detect the drowsing of the driver on a basis of the state of the eyelids and the head portion of the driver of the different vehicle, and can perform the alerting process according thereto.

The control unit may estimate a direction of a line of sight of the detected driver, and in a case where the estimated direction of the line of sight does not coincide with a direction of the mirror, the control unit may perform an alerting process of putting out an alert that the driver of the different vehicle does not recognize the own vehicle.

As a result, on a basis of the direction of the line of sight of the driver detected from the mirror, the control apparatus can invite an attention of the driver of the own vehicle in a case where it is determined that the driver does not recognize the own vehicle. In a case where it is possible to recognize that the driver of the different vehicle looks in the direction of the mirror from the mirror image, it is possible to estimate that the driver of the different vehicle looks in a direction of the own vehicle through the mirror image of the mirror.

The control unit may recognize a hand of the detected driver and a blinker lever of the different vehicle from the mirror image, and in a case where the control unit detects that the driver lays the hand on the blinker lever, the control unit may perform an alerting process of alerting a driver of the own vehicle that the driver of the different vehicle changes a course.

As a result, the control apparatus can detect, from the mirror image, that the driver of the different vehicle lays the hand on the blinker lever, and notifies the driver of the own vehicle of a possibility of a course change of the different vehicle.

The control unit may generate an image that indicates the recognized state of the driver of the different vehicle, and control a display control unit of the own vehicle to display the generated image in a superposed manner on a position corresponding to a driver's seat of the different vehicle on a front windshield of the own vehicle, which is capable of being visually confirmed by a driver of the own vehicle through the front windshield.

As a result, the control apparatus displays the state of the driver of the different vehicle, which cannot be visually confirmed by the driver of the own vehicle directly on a front windshield of the own vehicle in an AR (Augmented Reality) manner, thereby making it possible to cause the driver of the own vehicle to intuitively grasp the state of the driver of the different vehicle.

According to another embodiment of the present technology, a control method includes:

detecting a mirror provided to a different vehicle that exists in front of an own vehicle from a pickup image input from a camera provided to the own vehicle;

detecting a person from a mirror image of the detected mirror;

recognizing a state of the person from an image of the detected person; and performing an alerting process or a control process for the own vehicle to prevent an accident of the own vehicle or the different vehicle in accordance with the recognized state of the person.

According to another embodiment of the present technology, a program causes a control apparatus to execute the steps of:

detecting a mirror provided to a different vehicle that exists in front of an own vehicle from a pickup image input from a camera provided to the own vehicle;

detecting a person from a mirror image of the detected mirror;

recognizing a state of the person from an image of the detected person; and performing an alerting process or a control process for the own vehicle to prevent an accident of the own vehicle or the different vehicle in accordance with the recognized state of the person.

Advantageous Effects of Invention

As described above, according to the present technology, the state of the occupant of the different vehicle is recog-

MODE(S) FOR CARRYING OUT THE INVENTION

Hereinafter, embodiments according to the present technology will be described with reference to the drawings.

[Configurations of Automobile and Control Apparatus]

Figure 1:
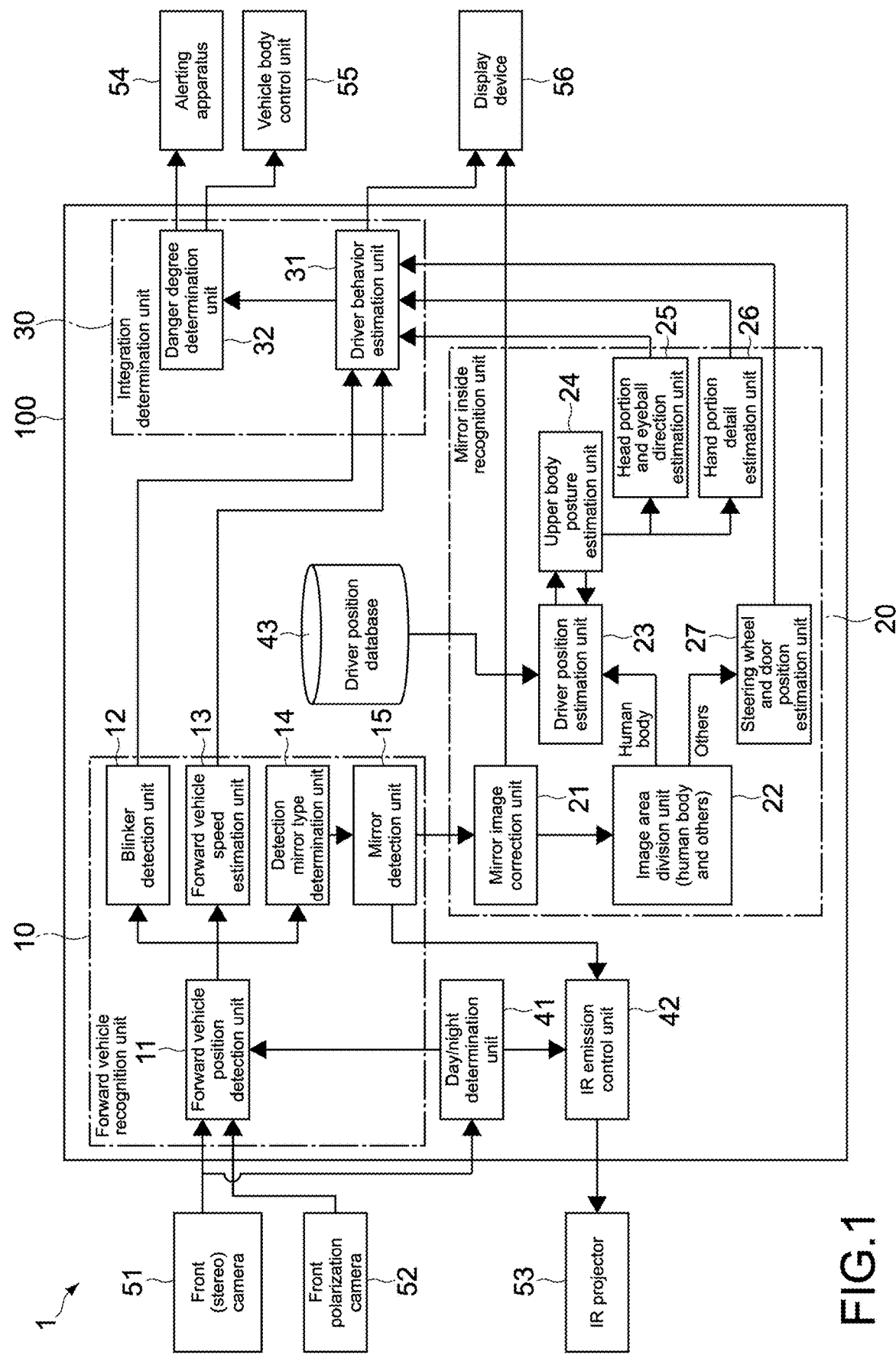
FIG. 1 A block diagram showing a configuration of an automobile including a control apparatus according to an embodiment of the present technology.

FIG. 1 is a block diagram showing a configuration of an automobile including a control apparatus according to an embodiment of the present technology.

As shown in the figure, an automobile 1 includes a control apparatus 100, a front camera 51, front polarization camera 52, an IR projector 53, an alerting apparatus 54, a vehicle body control unit 55, and a display device 56.

Further, the automobile 1 includes components provided to a general automobile such as drive apparatuses (seats, a steering wheel, seat belts, and the like), a steering apparatus (a power steering and the like), a braking apparatus, a vehicle body acceleration apparatus, a rearview mirror, a headlight, a taillight, and a blinker.

In this embodiment, the control apparatus 100 can recognize, from an image taken by the front camera 51 and the front polarization camera 52, a rearview mirror provided to a different vehicle (hereinafter, forward vehicle) that exists in a forward viewing field of the automobile 1 (own vehicle), and recognize a state of a person detected from a mirror image of the mirror.

As the rearview mirror, there are outer rearview mirrors including side mirrors (door mirrors) provided to front doors outside a vehicle or fender mirrors provided on front ends of a bonnet and an inner rearview mirror provided in the front of the vehicle on the inside thereof.

The control apparatus 100 includes hardware necessary for a computer, such as a CPU, a RAM, and a ROM, and is incorporated in the automobile 1 as a control circuit or a control unit. The CPU loads a program according to the present technology which is recorded in the ROM in advance and executes the program, with the result that a control method according to the present technology is performed.

A specific configuration of the control apparatus 100 is not limited. For example, a PLD (Programmable Logic Device) such as an FPGA (Field Programmable Gate Array) and a device such as an ASIC (Application Specific Integrated Circuit) may be used. Further, the control apparatus 100 may be configured as a part of a control unit of the automobile 1.

The front camera 51 is provided on a roof portion, a front bumper portion, or the like of the automobile 1, for example. The front camera 51 is configured by an image sensor such as a CMOS and a CCD, for example, and takes a video of RGB-IR of the forward viewing field of the automobile 1 at a predetermined frame rate.

Further, in a case where the front camera 51 is configured as a stereo camera, in addition to the RGB-IR video, depth (distance) information is also obtained. The video obtained by the front camera 51 is input to the control apparatus 100 so as to recognize the forward vehicle of the automobile 1 and a rearview mirror thereof.

The front polarization camera 52 is also provided to the roof portion, the bumper portion, or the like of the automobile 1. The front polarization camera 52 removes a reflection component caused due to window glass of the different vehicle from the video of the different vehicle that exists in front of the automobile 1 and extracts only a transmission component, thereby removing noises of the video of the different vehicle.

Specifically, from a taken image of the outer rearview mirror of the forward vehicle, the front polarization camera 52 removes a reflection component of front door glass (in a case of a door mirror) of the forward vehicle and a reflection component of a front windshield (in a case of a fender mirror) of the forward vehicle. Further, from a taken image of the inner rearview mirror of the forward vehicle, the front polarization camera 52 removes a reflection component of a rear window of the forward vehicle. The taken image from which the reflection component is removed by the front polarization camera 52 is input to the control apparatus 100 in order to recognize the forward vehicle and a rearview mirror thereof.

In a process in the control apparatus 100, one or both of the taken image by the front camera 51 and the taken image by the front polarization camera 52 may be used.

the control apparatus 100 includes control blocks of a forward vehicle recognition unit 10, a mirror inside recognition unit 20, and an integration determination unit 30. Further, the control apparatus 100 includes a day/night determination unit 41, an IR emission control unit 42, and a driver position database 43. Those control blocks may be configured as respective control circuits or may be configured as software modules.

From the image taken by the front camera 51 or the front polarization camera 52, the forward vehicle recognition unit 10 recognizes the forward vehicle of the automobile 1 (own vehicle). The forward vehicle recognition unit 10 includes a forward vehicle position detection unit 11, a blinker detection unit 12, a forward vehicle speed estimation unit 13, a recognition mirror type determination unit 14, and a mirror detection unit 15.

The forward vehicle position detection unit 11 detects a position where the forward vehicle exists from the taken image input from the front camera 51 or the front polarization camera 52. Specifically, the forward vehicle position detection unit 11 detects a position of the forward vehicle in the taken image, and determines whether the forward vehicle exists on the same traffic lane as the automobile 1 (own vehicle) or not.

From the image of the forward vehicle detected by the forward vehicle position detection unit 11, the blinker detection unit 12 detects a blinker of the forward vehicle and detects an on state thereof.

From a motion of the forward vehicle, a speed of the automobile 1 indicated by a speed meter of the automobile 1, or the like detected by the forward vehicle position detection unit 11, the forward vehicle speed estimation unit 13 estimates a speed of the forward vehicle.

The information detected by the blinker detection unit 12 and the forward vehicle speed estimation unit 13 is output to the integration determination unit 30 and is used to estimate a behavior of a driver of the forward vehicle.

The recognition mirror type determination unit 14 determines a type of the rearview mirror to be detected out of the rearview mirrors of the forward vehicle on a basis of the position (whether the vehicle exists on the same traffic lane as the automobile 1 or not) of the forward vehicle which is detected by the forward vehicle position detection unit 11.

The mirror detection unit 15 detects the mirror of the type determined by the detection mirror type determination unit 14 from among images of the forward vehicle detected by the forward vehicle position detection unit 11. The image of the detected mirror of the forward vehicle is output to the mirror inside recognition unit 20.

The mirror inside recognition unit 20 recognizes a state of a person from a mirror image of the mirror of the forward vehicle detected by the forward vehicle recognition unit 10. The mirror inside recognition unit 20 includes a mirror image correction unit 21, an image area division unit 22, a driver position estimation unit 23, an upper body posture estimation unit 24, a head portion and eyeball direction estimation unit 25, a hand portion detail estimation unit 26, and a steering wheel and door position estimation unit 27.

The mirror image correction unit 21 obtains a mirror image (hereinafter, simply referred to as mirror image) of the rearview mirror of the forward vehicle detected by the mirror detection unit 15, and corrects distortion or the like of the mirror image to perform subsequent recognition processes. This is because a convex mirror is often used for a rearview mirror.

The corrected mirror image is output to the image area division unit 22. Further, in some cases, the corrected mirror image is output to the display device 56 as a high-resolution mirror image which cannot be visually confirmed by a driver of the automobile 1 normally.

The image area division unit 22 divides the corrected mirror image into an image area of a human body and an image area of remaining parts (components in the forward vehicle).

The driver position estimation unit 23 estimates a position of a driver of the forward vehicle on a basis of a position of the image of the human body which is obtained by dividing the mirror image and positional data of a driver for each vehicle model stored in the driver position database 43.

Here, the driver position database 43 stores information that indicates a position of drivers (right steering wheel/left steering wheel) for each vehicle model. The driver position estimation unit 23 specifies, from the driver position database 43, a position of a driver corresponding to the vehicle model independently estimated by an image analysis (including character recognition) from a taken image in the forward vehicle recognition unit 10, and in the divided image, estimates a person who exists on the specified driver position as the driver.

Note that in a case where only one person is detected from the mirror image, the driver position estimation unit 23 specifies the person as the driver.

The upper body posture estimation unit 24 estimates a posture of an upper body of the driver from the divided image of the human body. The upper body posture estimation unit 24 recognizes a head portion area and a hand portion area from the human body image, and instructs the head portion and eyeball direction estimation unit 25 to perform a process for the head portion area and instructs the hand portion detail estimation unit 26 to perform a process for the hand portion area.

Figure 9:
FIG. 9 A diagram showing a state of a head portion and eyeball direction estimation process by the control apparatus.

The head portion and eyeball direction estimation unit 25 estimates (detects) a direction in which a head portion is directed, a face expression, and a direction in which eyeballs are directed (line of sight) in the human body image (see FIG. 9). For the estimation (detection) method, a known method (for example, angle and positional relationship of parts of the head portion, such as eyes, a nose, and a mouth in the image for the direction of the head portion, and positional relationship of black eyes (moving points) with respect to outlines of eyes for the direction of the line of sight) is used.

The hand portion detail estimation unit 26 estimates (detects) a motion of hands in the human body image, in particular, a motion of holding the steering wheel.

Figure 7:
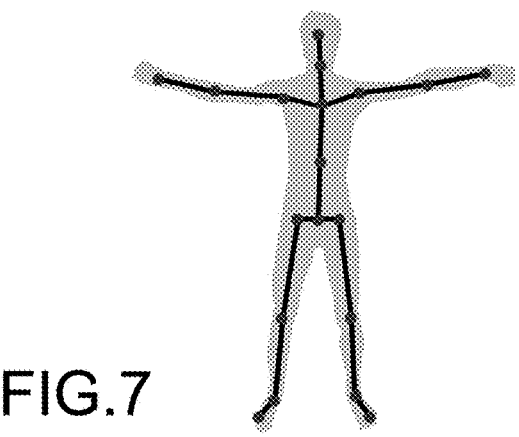
FIG. 7 A diagram showing an example of a joint point model of a human body used to perform a posture estimation process by the control apparatus.
Figure 8:
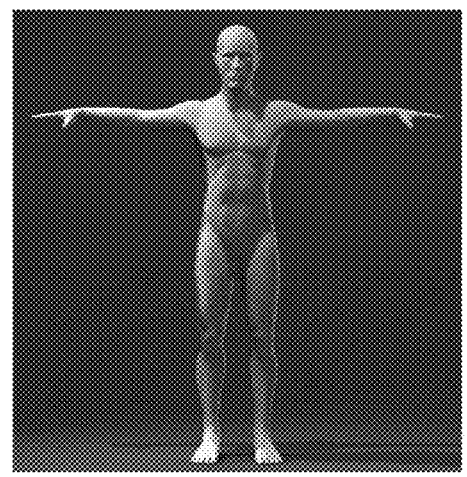
FIG. 8 A diagram showing an example of a 3D model of a human body used to perform the posture estimation process by the control apparatus.

For the estimation process by the upper body posture estimation unit 24 (head portion and eyeball direction estimation unit 25 and hand portion detail estimation unit 26), the control apparatus 100 stores data such as joint model data that indicates joint point positions of the human body (see FIG. 7) and 3D model data (shapes and sizes of parts of the human body, positional relationship among the parts, and the like: see FIG. 8) of the human body.

Specifically, in this embodiment, the control apparatus 100 stores various pieces of data for estimating the posture of the upper body of the person under a limited condition in which the person sits on a seat in the forward vehicle, and the upper body of the person is in the mirror image. FIG. 7 and FIG. 8 each show a whole body model of a standing person with hands horizontally raised. The 3D model data of the human body and the joint model data of the human body are deformed in accordance with various states including a state in which the driver sits on a driver's seat, a state in which the driver is trying to get on a car (sit on the seat), and a state in which the driver is trying to get out of the car, and are used to perform estimation. The upper body posture estimation unit 24 may cause portions of the human body detected from the mirror image to fit to the joint model and the 3D model of the human body, thereby estimating (detect) the posture of the driver in the mirror image, or may directly estimate positions and directions of joints, a skeleton, a body surface, and the like without fitting. At this time, the upper body posture estimation unit 24 may use a sensor different from the front camera 51 or may use a plurality of sensors. For example, by using a camera sensor capable of obtaining depth (distance) information, it is possible to recognize the human body with high accuracy.

The information estimated by the upper body posture estimation unit 24, the head portion and eyeball direction estimation unit 25, and the hand portion detail estimation unit 26 is output to the integration determination unit 30 and used to estimate the behavior of the driver of the forward vehicle.

Further, when performing the posture estimation process for the body of the person detected from the mirror image, instead of the driver position estimation unit 23, the upper body posture estimation unit 24 may estimate the position of the driver on a basis of the estimated posture or the relationship between the posture and the various components detected by the steering wheel and door position estimation unit 27. Specifically, for example, the upper body posture estimation unit 24 may estimate, as the position of the driver, a position of a person estimated as a person who performs a steering wheel operation or a gas pedal and brake operation.

The steering wheel and door position estimation unit 27 analyzes the divided image excluding the human body by pattern matching or the like, and estimates positions of various components in a vicinity of the driver's seat, such as the steering wheel, a (front) door, a blinker lever, and a seat belt. The information relating to the positions of the various components is also output to the integration determination unit 30 and used to estimate the behavior of the driver of the forward vehicle.

The integration determination unit 30 integrates the information relating to the forward vehicle recognized by the forward vehicle recognition unit 10 and the information relating to the state of the person recognized by the mirror inside recognition unit 20, and determines the behavior of the driver of the forward vehicle and a degree of danger according thereto. The integration determination unit 30 includes a driver behavior estimation unit 31 and a danger degree determination unit 32.

The driver behavior estimation unit 31 integrates the information recognized and output by the forward vehicle recognition unit 10 and the mirror inside recognition unit 20, and estimates the behavior of the driver of the forward vehicle or the state thereof. Specifically, on a basis of learning, an experiment, or the like, the driver behavior estimation unit 31 calculates, from data input from the forward vehicle recognition unit 10 and the mirror inside recognition unit 20, probabilities of occurrences of various behaviors of the driver, and estimates a behavior having a highest probability of the occurrence among those as the behavior of the driver. The method of calculating the probability of the occurrence of the behavior of the driver may be determined in advance on a basis of learning data and learning behavior data which are equivalent to data input from the mirror inside recognition unit by the learning, experiment, or the like. The estimated behavior information is output to the danger degree determination unit 32. Further, the behavior information may be output to the display device 56 as character information or image information, for example.

On a basis of the behavior information estimated by the driver behavior estimation unit 31, the danger degree determination unit 32 determines the degree of danger of a situation that the automobile 1 (own vehicle) or the forward vehicle faces or is facing. Specifically, on a basis of the learning, experiment, or the like, from data that indicates the behavior of the driver estimated by the driver behavior estimation unit 31, the danger degree determination unit 32 calculates probabilities of occurrences of various dangerous phenomena, and determines, as the degree of danger, a probability of an occurrence of a dangerous phenomenon having a highest probability thereof. The method of calculating the probability of the occurrence of the dangerous phenomenon may be determined in advance on a basis of learning data equivalent to the data that indicates the behavior of the driver by the learning, experiment, or the like and learning dangerous phenomenon data. In a case where it is determined that the degree of danger is high, the danger degree determination unit 32 instructs the alerting apparatus 54 to put out an alert or instructs the vehicle body control unit 55 to perform automatic control for a vehicle body of the automobile 1. The behavior estimation process and a danger degree determination process will be described later.

The alerting apparatus 54 is a sound output unit for notifying the driver of the automobile 1 (own vehicle) or the driver of the forward vehicle of a danger, for example. The alert output from the alerting apparatus 54 is a verbal message, a buzzer, or the like with respect to the driver of the automobile 1, while the alert is a horn or the like with respect to the driver of the forward vehicle. In a case where the alert is the message, a voice guide output unit in a car navigation apparatus in the automobile 1 may function as the alerting apparatus 54.

The vehicle body control unit 55 is connected with a steering apparatus, a braking apparatus, a vehicle body acceleration apparatus, and the like of the automobile 1, for example, and in accordance with the determined degree of danger, performs an automobile body control process for the automobile 1 to avoid dangers such as a collision against the forward vehicle due to deceleration, a route change, or the like.

The display device 56 is a projection apparatus or the like for causing a display of a car navigation apparatus of the automobile 1 or at least a part of a front windshield of the automobile 1 as a head-up display, for example. As described above, the display device 56 displays the information (character or image) that indicates the behavior of the driver of the forward vehicle estimated by the driver behavior estimation unit 31, and displays the mirror image corrected by the mirror image correction unit 21 to the driver of the automobile 1. Between the display device 56 and the control apparatus 100, a display control unit that controls image displaying in the display device 50 may be provided.

The alerting apparatus 54 and the display device 56 may operate at the same time in order to put out an alert to the driver of the automobile 1, or only one of those may operate.

The day/night determination unit 41 determines whether a current state is in day or night on a basis of lightness of the taken image input from the front camera 51. The day/night determination unit 41 may determine day or night by using a current time in addition to or instead of the lightness of the taken image.

In a case where the day/night determination unit 41 determines that the current state is in night, the IR emission control unit 42 controls the IR projector 53 in such a manner as to project infrared rays toward the detected forward vehicle in order to robustly obtain the image of the forward vehicle and the mirror image even in night and recognize the human body and the like in the mirror image. In a case where the mirror detection unit 15 detects the rearview mirror of the forward vehicle, the IR emission control unit 42 may control the IR projector 53 in such a manner as to collectively project the infrared rays only to the detected rearview mirror.

[Operation of Control Apparatus]

Subsequently, an operation of the control apparatus 100 configured as described above will be described. The operation is performed in cooperation with hardware and software of the control apparatus 100.

(Outline of Operation of Control Apparatus)

Figure 2:
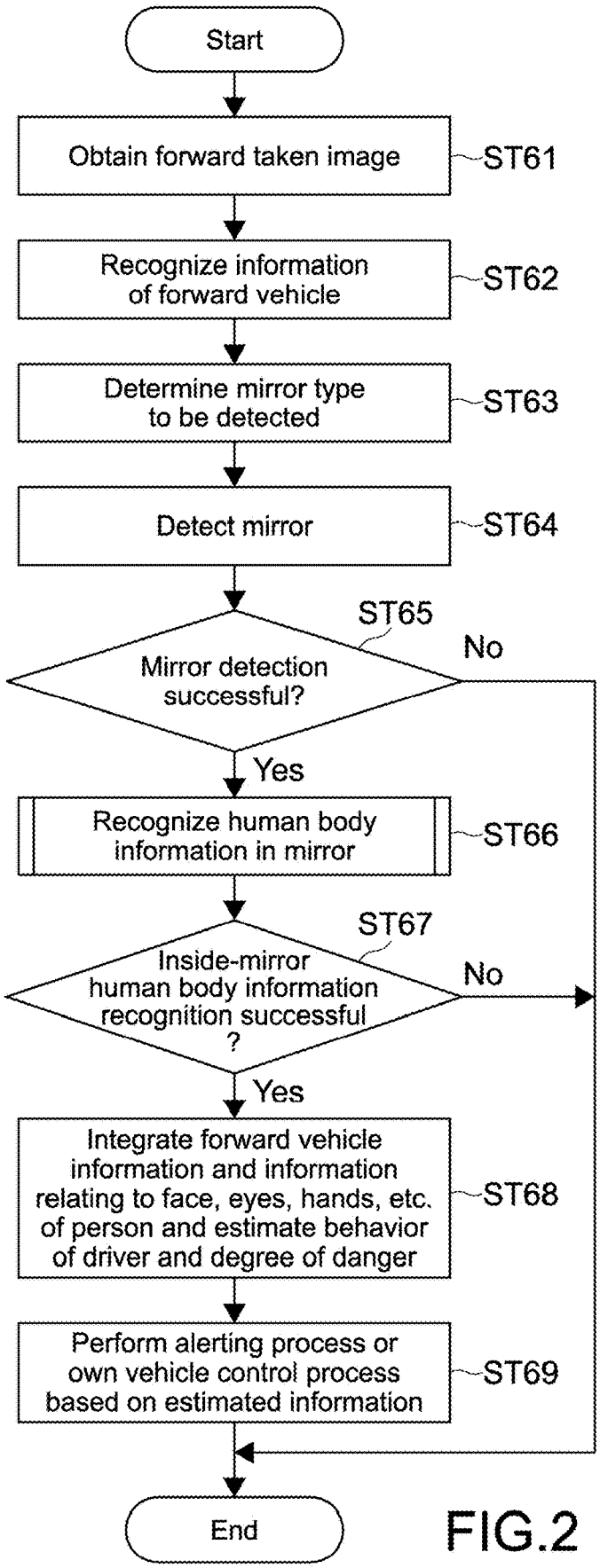
FIG. 2 A flowchart showing a brief operation flow of the control apparatus.

FIG. 2 is a flowchart showing an outline of the operation of the control apparatus 100.

As shown in the figure, first, the forward vehicle recognition unit 10 of the control apparatus 100 obtains a forward taken image from the front camera 51 or the front polarization camera 52 (Step 61).

Then, forward vehicle recognition unit 10 recognizes information of the forward vehicle from the pickup image (Step 62).

Specifically, the forward vehicle recognition unit 10 recognizes the position of the forward vehicle from the pickup image by the forward vehicle position detection unit 11, recognizes the state of the blinker of the forward vehicle by the blinker detection unit 12, and recognizes a speed of the forward vehicle by the forward vehicle speed estimation unit 13. Further, the forward vehicle recognition unit 10 outputs the recognized pieces of information to the integration determination unit 30.

Subsequently, the forward vehicle recognition unit 10 determines a type of the rearview mirror to be detected among the rearview mirrors of the forward vehicle by the recognition mirror type determination unit 14 (Step 63).

Figure 3:
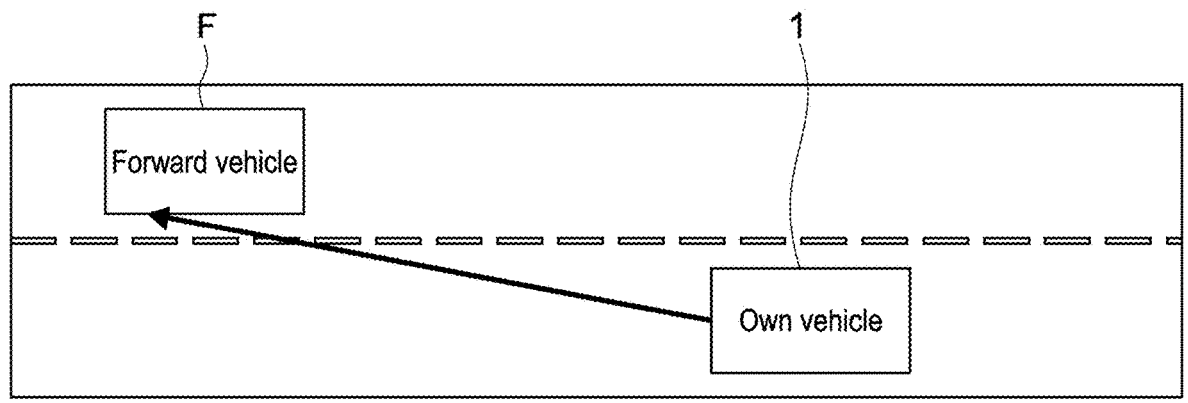
FIG. 3 A diagram for explaining a switching process of a detection mirror according to a position of a forward vehicle by the control apparatus.
Figure 3:
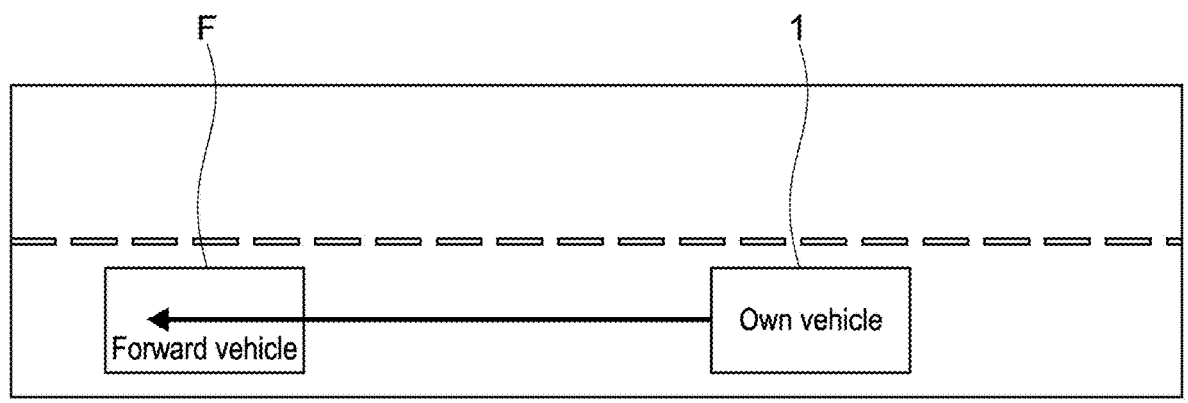

FIG. 3 is a diagram for explaining a determination process of the mirror type to be recognized.

As shown in FIG. 3A, in a case where it is detected from the pickup image that a forward vehicle F exists on a traffic lane (diagonally in front of the own vehicle 1) different from an own vehicle 1, the recognition mirror type determination unit 14 determines the outer rearview mirror (door mirror or fender mirror) out of the rearview mirrors of the forward vehicle as a recognition target.

On the other hand, as shown in FIG. 3B, in a case where it is detected from the pickup image that the forward vehicle F exists on the same traffic lane (on a straight line along the own vehicle 1) as the own vehicle 1, the recognition mirror type determination unit 14 determines the inner rearview mirror out of the rearview mirrors of the forward vehicle as the recognition target.

Then, the forward vehicle recognition unit 10 detects the rearview mirror determined as the recognition target from the image of the forward vehicle by the mirror detection unit 15 (Step 64).

Then, the forward vehicle recognition unit 10 determines whether the mirror detection unit 15 succeeds in detecting the rearview mirror or not (Step 65). In a case where the mirror detection unit 15 succeeds in detecting (Yes), the forward vehicle recognition unit 10 extracts an area of the mirror image detected from the pickup image and outputs the extracted area to the mirror inside recognition unit 20.

Then, the mirror inside recognition unit 20 recognizes human body information in the mirror from the mirror image (Step 66). Hereinafter, a recognition process of the human body information in the mirror will be described in detail.

(Details of Mirror Inside Recognition Process)

Figure 4:
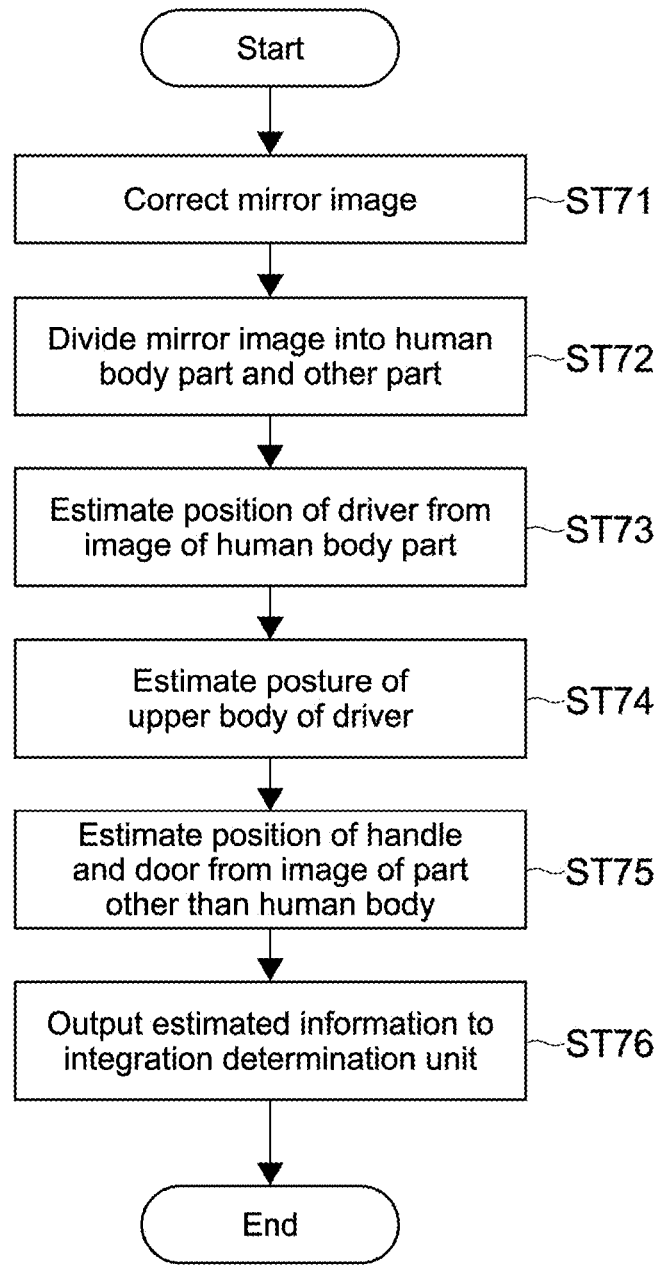
FIG. 4 A flowchart showing a detailed flow of a mirror inside recognition process by the control apparatus.

FIG. 4 is a flowchart showing a detailed flow of a mirror inside recognition process.

As shown in the figure, first, the mirror inside recognition unit 20 corrects a distortion or the like of the mirror image by the mirror image correction unit 21 to perform subsequent recognition processes (Step 71).

Then, in the mirror inside recognition unit 20, the image area division unit 22 divides the corrected mirror image into a human body image area and a remaining (components in the forward vehicle) image area (Step 72).

Then, in the mirror inside recognition unit 20, the driver position estimation unit 23 estimates a position of the driver of the forward vehicle on a basis of a position of the divided human body image and position data of drivers for each vehicle model stored in the driver position database 43 (Step 73).

Then, in the mirror inside recognition unit 20, the upper body posture estimation unit 24, (head portion and eyeball direction estimation unit 25 and hand portion detail estimation unit 26) estimates a posture of an upper body of the driver from the divided human body image (Step 74).

As described above, the upper body posture estimation unit 24 causes the parts of the human body detected from the human body image to fit to the joint model or the 3D model of the human body (see FIG. 7 and FIG. 8), thereby tracking the posture of the driver.

Further, as shown in FIG. 9, the head portion and eyeball direction estimation unit 25 estimates a direction in which the head portion of the driver is directed, a face expression, a direction of the line of sight on a basis of a positional relationship among eyes, a nose, and a mouse, shapes of those, a positional relationship of black eyes with respect to outlines of the eyes, and the like in the image of the driver.

Further, on a basis of states of the head portion, the upper body, arms and hands of the driver and 3D shapes of those in the image of the driver, the hand portion detail estimation unit 26 detects a motion of holding the steering wheel by the driver, a state of touching another component (for example, blinker lever, seat belt, front door, or the like) in the automobile, or the like.

Then, in the mirror inside recognition unit 20, the steering wheel and door position estimation unit 27 estimates, from the image excluding the human body in the mirror image, positions of various in-vehicle components such as the steering wheel, front door, blinker lever, seat belt, and the like in the vicinity of a driver's seat (Step 75).

Further, the mirror inside recognition unit 20 outputs information relating to the human body and the in-vehicle components estimated by the process described above to the integration determination unit 30 (Step 76).

Figure 5:
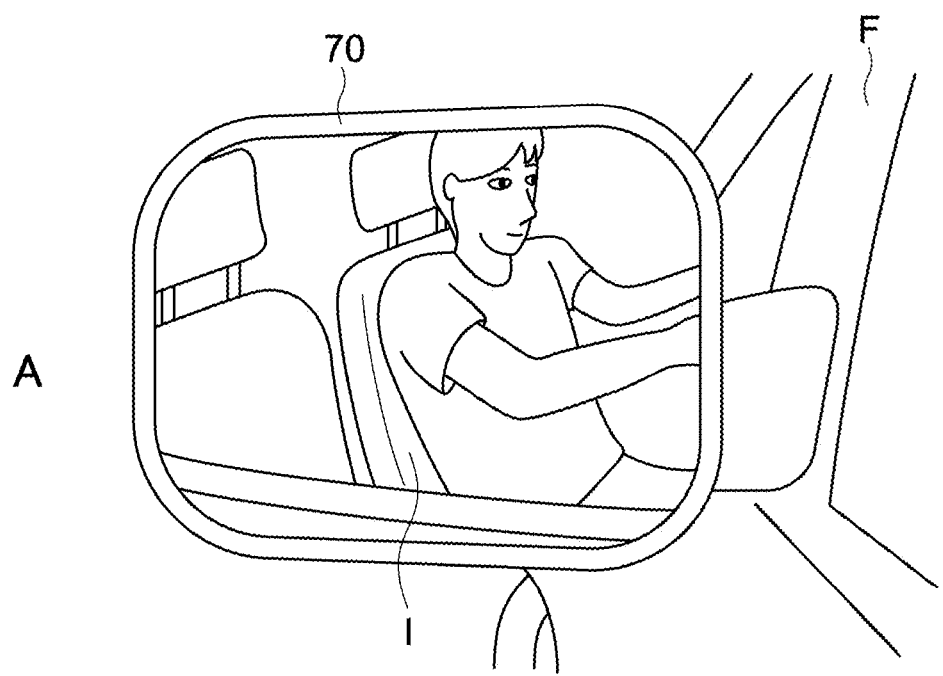
FIG. 5 A diagram showing an example of a mirror image of an outer rearview mirror detected by the control apparatus.
Figure 5:
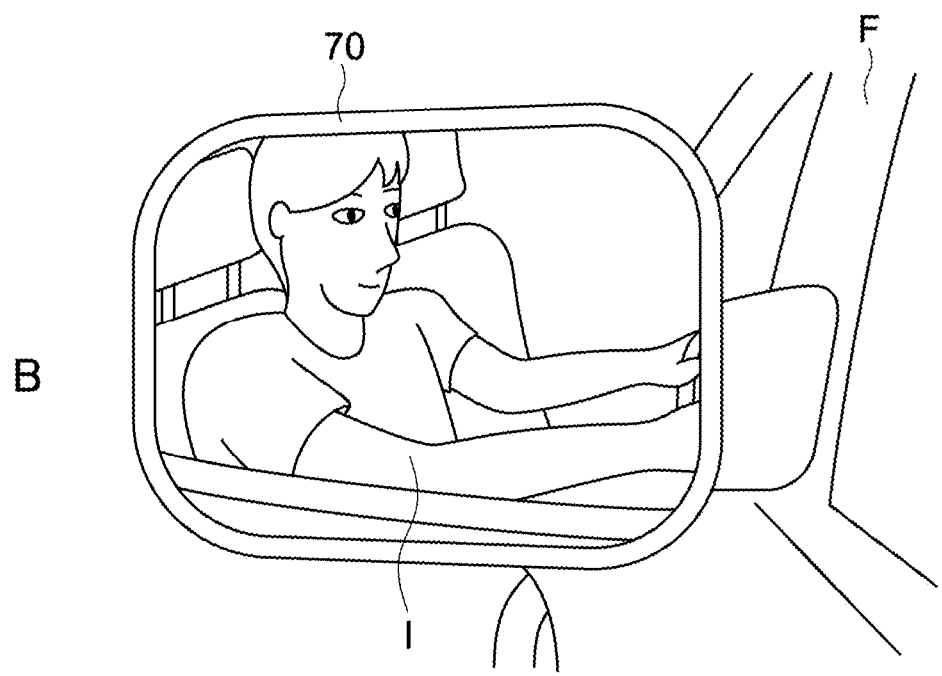

FIG. 5 is a diagram showing an example of the mirror image of the outer rearview mirror (door mirror) of the forward vehicle detected by the mirror detection unit 15.

FIG. 5 shows the mirror image of the door mirror of the forward vehicle that exists diagonally forward right of the automobile 1. FIG. 5A shows the mirror image in a case where a driver's seat (steering wheel) of the forward vehicle is on a left side in the vehicle, and FIG. 5B shows the mirror image in a case where driver's seat of the forward vehicle is on a right side in the vehicle.

As shown in FIG. 5, in a case where the recognition target is a door mirror 70 of the forward vehicle F, from a mirror image I, it is possible to recognize an image of the upper body (including head portion and arms) of the driver and the driver's seat, irrespective of whether the driver's seat is on the door mirror 70 side of the recognition target or on an opposite side thereto. In particular, a most area of the head portion of the driver can be visually confirmed. Thus, the mirror inside recognition unit 20 can obtain information relating to the head portion and a direction of the line of sight by the head portion and eyeball direction estimation unit 25.

Further, as shown in FIG. 5B, in a case where the driver's seat is on the door mirror side as the recognition target, even hands of the driver and the steering wheel can be visually confirmed. Therefore, in this case, the mirror inside recognition unit 20 can recognize information relating to a driving state of the driver by recognizing the hands of the driver and the steering wheel by the hand portion detail estimation unit 25.

On the other hand, as shown in FIG. 5A, in a case where the driver's seat is on the side opposite to the door mirror as the recognition target, the hands of the driver and the steering wheel may not be visually confirmed. In this case, the upper body posture estimation unit 24 can estimate information relating to whether the driver holds the steering wheel, for example, on a basis of the head portion of the driver, an angle between the upper body and the arms, an angle of a joint of an elbow, or the like.

Figure 6:
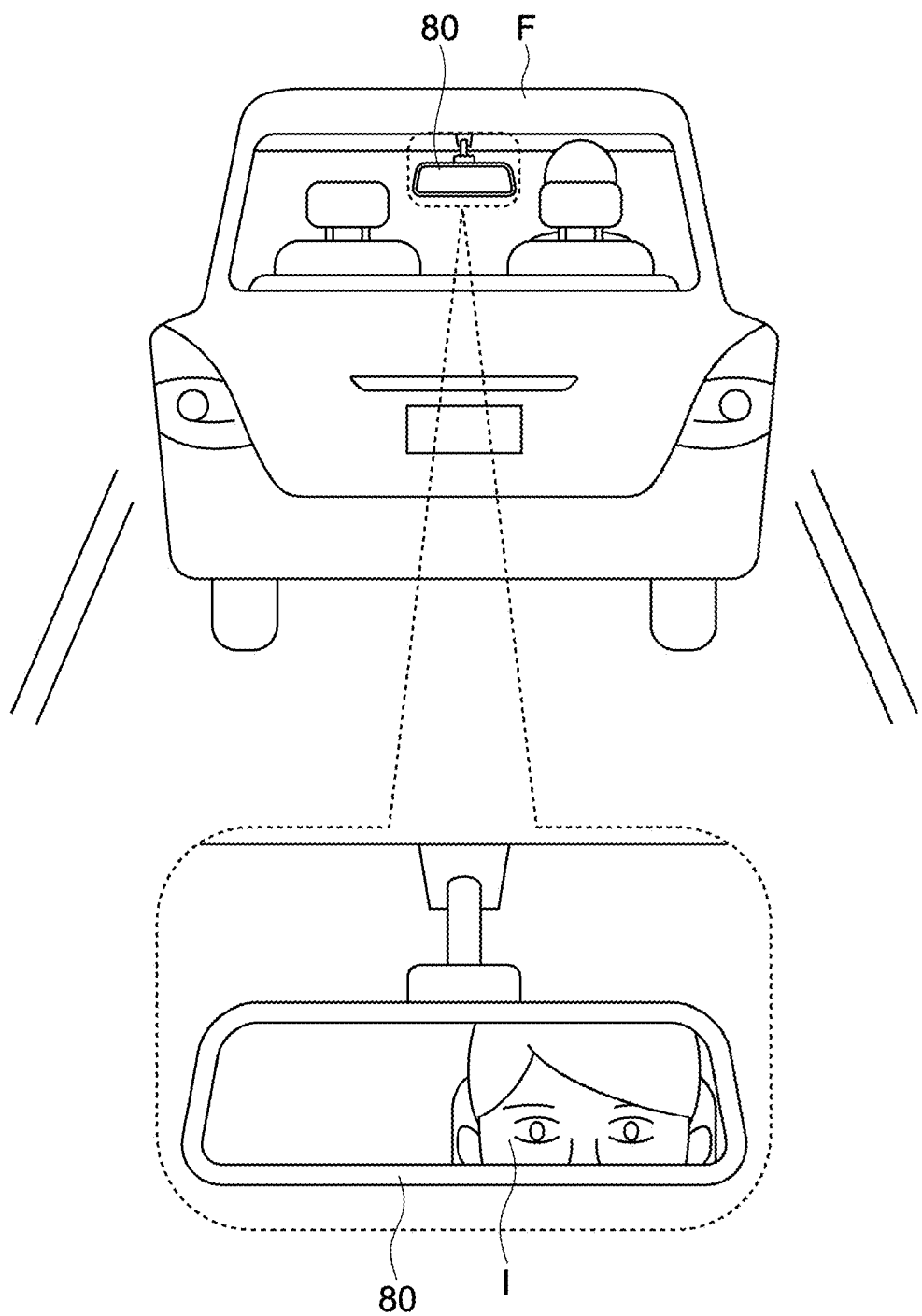
FIG. 6 A diagram showing an example of a mirror image of an inner rearview mirror detected by the control apparatus.

Further, FIG. 6 is a diagram showing an example of a mirror image of the inner rearview mirror of the forward vehicle detected by the mirror detection unit 15.

As shown in the figure, in a case where the recognition target is an inner rearview mirror 80 of the forward vehicle F, from the mirror image I, only the head portion of the driver and the driver's seat (headrest) can be visually confirmed in many cases. Thus, in this case, unlike the case where the door mirror is the recognition target, the mirror inside recognition unit 20 does not perform the processes by the upper body posture estimation unit 24 and the hand portion detail estimation unit 26, but performs only the estimation process by the head portion and eyeball direction estimation unit 25.

With reference to FIG. 2 again, in a case where the mirror inside recognition unit 20 succeeds in the recognition process for the human body information in the mirror image (Step 67), the integration determination unit 30 integrates the forward vehicle information output from the forward vehicle recognition unit 10, and the information relating to the face, eyes, hands, and the like of the person (driver) output from the mirror inside recognition unit 20, estimates the behavior of the driver, and estimates the degree of danger according to the behavior (Step 68). Specifically, the integration determination unit 30 uses the forward vehicle information, the information relating to the face, eyes, hands, and the like of the driver, and a method predetermined by learning (experiment), to calculate probabilities of occurrences of various behaviors of the driver. Out of those, the integration determination unit 30 estimates a behavior having the highest probability of the occurrence as the behavior of the driver, uses the method predetermined by the learning (experiment) for the estimated behavior, and calculates probabilities of occurrences of various dangerous phenomena. Out of those, the probability of the occurrence of a dangerous phenomenon having the highest probability of the occurrence is estimated as the degree of danger. Data of the method determined by the learning (experiment) may prescribe a condition in which the behaviors of the driver are established (in a case where the driver takes a certain behavior, a behavior taken by the driver or a state of the driver as a premise, a state of the components in the automobile 1 as a premise, or the like).

Further, on a basis of the estimated information, the integration determination unit 30 causes an alerting process by using at least one of the alerting apparatus 54 and the display device 56 or the automobile body control process for the automobile 1 by the vehicle body control unit 55 (Step 69).

Hereinafter, a detailed description will be given on an estimation process of the behavior of the driver by the integration determination unit 30, the danger degree determination process, and the alerting process or a vehicle body control process corresponding thereto by using specific examples.

Specific Example 1

The integration determination unit 30 can detect the driver who tries to open the door and get out of the vehicle during parking of the forward vehicle. The mirror as the recognition target in this case is the outer rearview mirror.

In a case where the behavior is detected, from at least the fact that an estimation speed of the forward vehicle which is output from the forward vehicle recognition unit 10 is 0 (stopped state) and the information output from the mirror inside recognition unit 20, the integration determination unit 30 performs estimation with the fact that the driver of the forward vehicle is estimated to lay the hand on the front door as a determination condition.

The fact that the driver lays the hand on the front door is determined by, for example, recognizing the position of the front door from the mirror image of the outer rearview mirror by the steering wheel and door position estimation unit 27, and recognizing the hands of the driver is directed toward the front door by the hand portion detail estimation unit 26.

Further, the integration determination unit 30 may set at least one of blinking of both of blinkers (hazard lamp blinking state), watching an outside from the front door glass by the driver, and unfastening the seat belt by the driver as an additional determination condition, for example.

Watching the outside from the front door glass by the driver is determined by recognizing the position of the front door glass from the mirror image, and recognizing the line of sight of the driver is directed toward the front door glass, for example.

Further, unfastening the seat belt by the driver is determined by recognizing whether a belt-shaped object (seat belt) having a predetermined width exists at a predetermined angle diagonally on the upper body (chest part) of the driver or not, or recognizing an operation of putting the hand on the seat belt and detaching the seat belt by the driver, for example.

As the alerting process in a case where the behavior of getting out of the vehicle is detected, the integration determination unit 30 may output a voice message of "a person is getting out of the vehicle" or the like to the driver of the automobile 1 from the alerting apparatus 54, or display character information indicating a similar message on the display device 56, thereby giving an alert of getting out of the vehicle by the driver of the forward vehicle, for example.

Further, in addition to the alert or instead thereof, the integration determination unit 30 may output a voice message of "a vehicle is approaching" or a horn to the forward vehicle, thereby putting out an alert of an approach by a backward vehicle (automobile 1).

Further, as the dangerous phenomenon, in a case where the front door of the forward vehicle is opened, the integration determination unit 30 determines whether the automobile 1 is running on a position where the automobile may collide against the forward vehicle or the driver or not. In a case where it is determined that there is a possibility of the collision (this is the dangerous phenomenon), the integration determination unit 30 may perform automatic control for a rudder angle of the steering apparatus of the automobile 1 to a right or left direction by the by the vehicle body control unit 55 so as to avoid the forward vehicle or the driver. On the other hand, in a case where it is determined that there is no possibility of the collision (this is not the dangerous phenomenon) even if the behavior of getting out of the vehicle is detected, the integration determination unit 30 may only display the fact on the display unit 56, for example.

Specific Example 2

The integration determination unit 30 can detect drowsy driving by the driver of the forward vehicle.

In a case of detecting the drowsy driving, the integration determination unit 30 performs estimation with at least one behavior of the followings as a determination condition.
1) Eyelids of the driver are closed for a predetermined period or more by a predetermined frequency or more.
2) A state is continued in which the driver directs the face downwards by a predetermined angle or more for predetermined period or more.
3) The driver has a sleepy expression.
4) The hand of the driver is fallen off from the steering wheel.
5) The driver does not continue to operate the steering wheel.
6) An accelerating is weakened.
7) The vehicle body is weaving.

The mirror as the recognition target in this case is the outer rearview mirror typically, for the conditions 1) to 3) described above, the determination can be performed even in a case where the inner rearview mirror is set as the recognition target.

Out of the conditions 1) to 7), the conditions 1) and 2) may be set as the determination conditions. The conditions 1) to 6) are determined from the estimation result by the mirror inside recognition unit 20, and the condition 7) is determined from estimation result by the forward vehicle recognition unit 10.

Specifically, the condition 1) is determined by measuring a duration and taking a count of a state in which a black eye is not detected by the head portion and eyeball direction estimation unit 25. The condition 2) is determined by an estimation result of an upper body posture (degree of bending of a neck joint) of the driver and a direction of the head portion by the upper body posture estimation unit 24. Further, for determination of the condition 3), an expression recognition technique for the driver by the head portion and eyeball direction estimation unit 25 is used. The conditions 4) and 5) are determined by a tracking result of a motion of the hands of the driver by the hand portion detail estimation unit 26. Further, the condition 6) is determined from a deceleration pattern of the vehicle body of the forward vehicle in a case where it is difficult to perform the determination from an estimation of a posture of feet of the driver. The condition 7) is determined by change information relating to the position of the forward vehicle by the forward vehicle position detection unit 11.

In a case where the integration determination unit 30 detects the conditions 1) and 2), for example, by the estimation of the behavior of the head portion and eyeball direction or the estimation of the behavior of the upper body posture, the integration determination unit 30 determines that there is a high possibility of drowsy driving by the driver as the dangerous phenomenon. As the alerting process when the drowsy driving is detected, the integration determination unit 30 may output, to the driver of the automobile 1, a voice message for notifying that the driver of the forward vehicle is drowsing from the alerting apparatus 54 or display character information indicting the similar message on the display device 56 to put out an alert, for example.

Further, the integration determination unit 30 may output a buzzer or horn to the driver of the forward vehicle from the alerting apparatus 54 to put out an alert.

Specific Example 3

The integration determination unit 30 can estimate whether the forward vehicle recognizes the automobile 1 (own vehicle) or not. The mirror as the recognition target in this case may be the outer rearview mirror or the inner rearview mirror.

In a case where this behavior is detected, on a basis of a result of the estimation by the head portion and eyeball direction estimation unit 25, the integration determination unit 30 estimates the direction of the line of sight of the driver of the forward vehicle. In a case where the estimated direction coincides with the direction of the mirror, it is determined that the driver of the different vehicle recognizes the automobile 1. In a case where the estimated direction does not coincide with the direction of the mirror, it is determined that the driver of the different vehicle does not recognize the automobile 1.

This is because it is possible to estimate that the driver of the forward vehicle watches the direction of the automobile 1 through the mirror image of the mirror, in a case where it is possible to recognize that the driver of the forward vehicle watches the direction of the mirror from the mirror image.

At this time, the integration determination unit 30 may set a determination function in such a manner that a degree of recognition of the automobile 1 becomes higher, as a number of times by which the driver of the forward vehicle watches the direction of the automobile 1 is increased, a watching period is increased, and a time when the driver of the forward vehicle watches the direction of the automobile 1 is more recently.

Further, in a case where it is estimated that the time or frequency of watching the direction of the automobile 1 by the driver of the forward vehicle is equal to or less than a predetermined threshold value, the integration determination unit 30 determines that this is the dangerous phenomenon. As the alerting process in this case, in a case where the degree of recognition determined by the determination function is equal to or less than the predetermined threshold value, the integration determination unit 30 outputs a voice message of "the forward vehicle does not recognize the own vehicle" from the alerting apparatus 54 to the driver of the automobile 1 to put out an alert.

Figure 10:
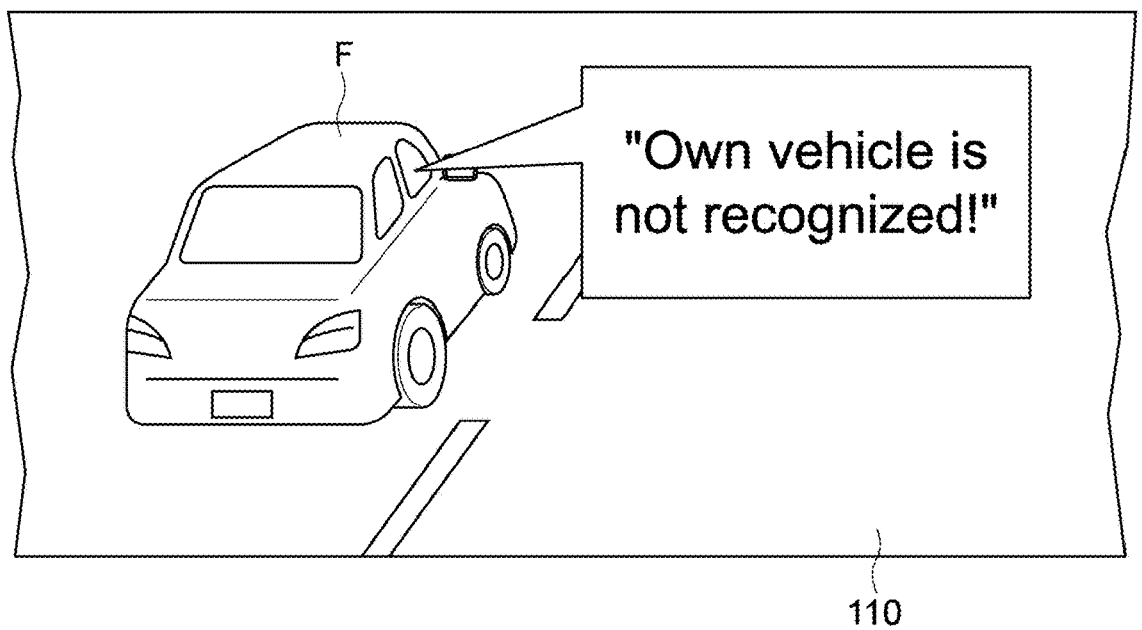
FIG. 10 A diagram showing an example of an alert displaying by the control apparatus corresponding to a behavior of a driver of a forward vehicle.

Further, the integration determination unit 30 may put out an alert by displaying character information that indicates a similar message on the display device 56. In this case, the display device 56 may be a display of the car navigation apparatus. Further, as shown in FIG. 10, the integration determination unit 30 uses a front windshield 110 of the automobile 1 as a display device, and on the front windshield, superposes the message on a position of the forward vehicle F as AR which is visually confirmed through the front windshield 110 by the driver of the automobile 1, thereby indicating the position of the forward vehicle that does not recognize the automobile 1.

Specific Example 4

The integration determination unit 30 can estimate that the driver of the forward vehicle drinks and drives. The recognition target mirror in this case may be the outer rearview mirror or the inner rearview mirror.

The integration determination unit 30 may determine whether the driver of the forward vehicle drinks and drives or not on a basis of whether a determination result by a drink driving determination device shows Yes or No. The drink driving determination device is created by performing machine learning for a face movement, expression, face color, and the like of the driver of the forward vehicle by the head portion and eyeball direction estimation unit 25, for example. On a basis of learning data and a result of a behavior estimation for the face movement, expression, face color, and the like of the driver, as the dangerous phenomenon, whether the driver drinks and drives or not is determined. Further, the drink driving determination device may takes into consideration a degree of weaving or the like of the forward vehicle detected by the forward vehicle recognition unit 10.

In a case where the drink driving determination device determines that the driver of the forward vehicle drinks and drives, the integration determination unit 30 may output the fact as a voice message by the alerting apparatus 54 to put out an alert for the driver of the automobile 1. Further, the integration determination unit 30 may display character information that indicates the fact on a display of the car navigation apparatus, or may superpose the character information that indicates the message on the front windshield 110 as AR on the position of the forward vehicle as in a similar way to the example of FIG. 10.

Specific Example 5

The integration determination unit 30 can detect that the driver of the forward vehicle performs inattentive driving. The recognition target mirror in this case may be the outer rearview mirror or the inner rearview mirror.

As a determination condition of the inattentive driving, the integration determination unit 30 estimates whether the driver of the forward vehicle watches a direction other than the front (substantially vertical direction to the front windshield) on a basis of the behavior estimation by the head portion and eyeball direction estimation unit 25, and as the dangerous phenomenon, determines whether a number of times by which the driver watches the direction other than the front for a predetermined period or more and a frequency thereof exceed threshold values or not.

At this time, in a case where the line of sight of the driver is directed toward the inner rearview mirror, the outer rearview mirror, and the display of the car navigation apparatus, the integration determination unit 30 excludes this action from the threshold value determination in principle. However, in a case where a period thereof or a count thereof exceeds a predetermined threshold value, the integration determination unit 30 regards the action as the inattentive driving and release the exclusion.

Further, along with this determination, the integration determination unit 30 takes into consideration such a phenomenon that the vehicle body of the forward vehicle is weaving, is approaching another vehicle, is deviating from the traffic lane, for example on a basis of a result of the detection by the forward vehicle recognition unit 10.

In a case where the inattentive driving is detected as the dangerous phenomenon, the integration determination unit 30 may output a voice message that indicates the fact by the alerting apparatus 54 to the driver of the automobile 1 to put out an alert. Further, the integration determination unit 30 may display character information that indicates the massage of the fact on the display of the car navigation apparatus, or may superimpose the character information that indicates the message on the position of the forward vehicle on the front windshield 110 as AR as in a similar way to the example shown in FIG. 10.

Figure 11:
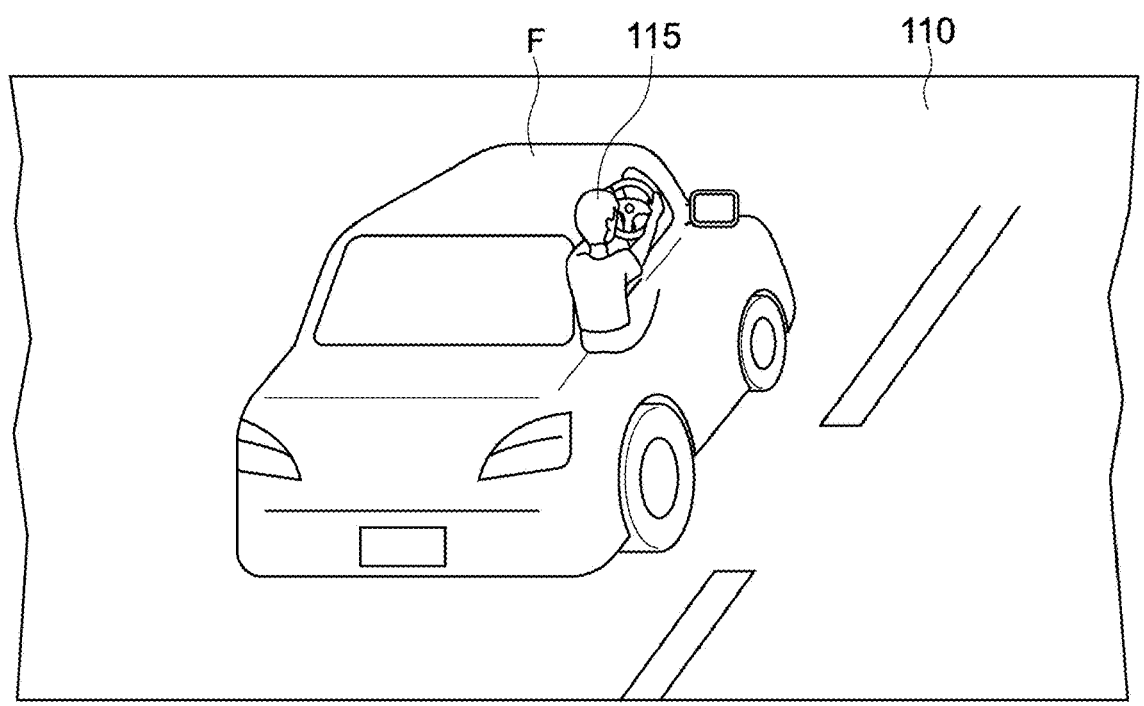
FIG. 11 A diagram showing an example of an alert displaying by the control apparatus corresponding to the behavior of the driver of the forward vehicle.
Figure 12:
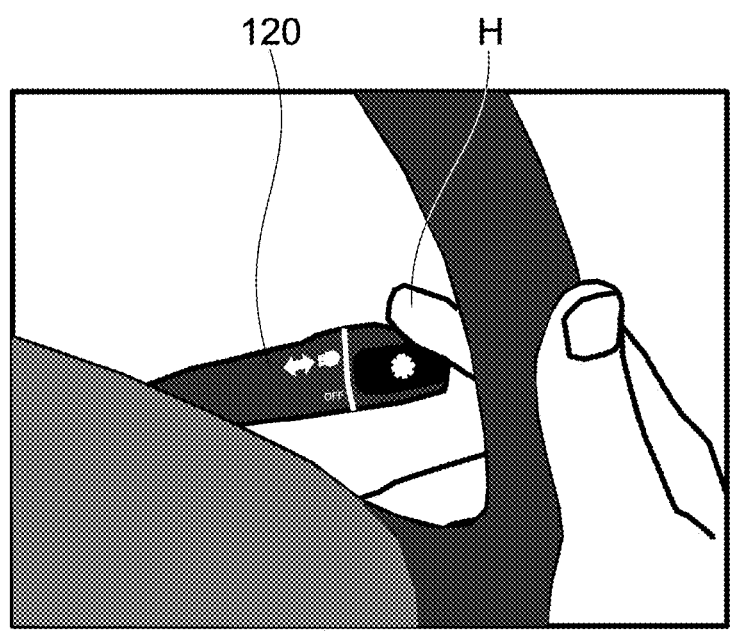
FIG. 12 A diagram showing a state in which the driver of the forward vehicle lays a hand on a lever for turning on a blinker.

Further, as shown in FIG. 11, the integration determination unit 30 generates an image 115 that shows the behavior of the driver of the forward vehicle, which is determined on a basis of the result of the estimation by the head portion and eyeball direction estimation unit 25, and may superimpose this on a position of the driver's seat of the forward vehicle F on the front windshield 110 of the automobile 1 as AR. At this time, in a case where an object (for example, mobile phone, book, or the like) that exists in the direction of the line of sight of the driver of the forward vehicle who performs inattentive driving can be detected, the integration determination unit 130 may generate an image thereof and superpose the generated image with the image 115.

As described above, the image that shows the state and behavior of the driver of the forward vehicle is generated, and is superposed on the position of the driver's seat of the forward vehicle on the front windshield 110. This is not limited to the case of the inattentive driving.

That is, the mirror inside recognition unit 20 uses the 3D model of the human body at a time of estimating the posture of the driver of the forward vehicle. Therefore, it is possible to create a video of the driver of the forward vehicle viewed from behind, which cannot be viewed from the driver of the automobile 1 in actuality.

Further, the integration determination unit 30 can recognize a way that the driver of the automobile 1 views the driver of the forward vehicle. Thus, as shown in FIG. 11, the image 115 of the driver of the forward vehicle F can be displayed in a superposed manner on the position of the driver's seat of the forward vehicle F.

For example, although it is possible to output a voice or character information indicating "driver of the forward vehicle is inattentive" to the driver of the automobile 1, this makes it difficult to grasp a degree of inattentiveness of the driver of the forward vehicle. An actual video of the inattentive driving makes it easier to grasp the degree of inattentiveness.

Further, also in a case where it is determined that the driver of the forward vehicle drinks and drives, the driver of the automobile 1 may easily grasp a degree of being drunk by watching a video in which the driver of the forward vehicle is drunk directly as compared to a case where an alert is put out by a voice or character information indicating that "degree of drunkenness of the driver of the forward vehicle is 70%". Further, for not only whether the driver of the forward vehicle is drunk or not but also fine secondary elements such as whether the driver is distracted or fierce, the mirror inside recognition unit 20 recognizes the motion of the body of the driver of the forward vehicle and shows with respect to the driver of the automobile 1 as AR display, with the result that the driver can intuitively grasp a condition mentioned above in many cases.

Specific Example 6

The integration determination unit 30 can predict whether the forward vehicle changes a course. The recognition target mirror in this case is the outer rearview mirror.

In a case where a state immediately before the course change is detected, the integration determination unit 30 performs estimation with at least one of the following behaviors as a determination condition.

1) The line of sight of the driver of the forward vehicle is directed toward the outer rearview mirror.
2) The driver of the forward vehicle visually confirms an adjacent traffic lane.
3) The driver of the forward vehicle turns and watches a rear of the traffic lane.
4) The forward vehicle is decelerated.
5) The driver of the forward vehicle starts to turn the steering wheel.
6) The driver of the forward vehicle lays the hand on the blinker lever.
7) The forward vehicle puts on the blinker.

The integration determination unit 30 may use the condition 6) out of the conditions 1) to 7) as the determination condition. FIG. 11 is a diagram showing a state in which the driver lays a hand H on a blinker lever 120. An operation of 6) is a preliminary operation for putting on the blinker. Depending on persons, a hand is laid on the lever well in advance before the blinker is put on in some cases. Therefore, the integration determination unit 30 detects this operation, thereby making it possible to detect the course change with high probability.

The integration determination unit 30 determines, from the determination condition, that the forward vehicle is in a state immediately before changing the course as the dangerous phenomenon, and in a case where the forward vehicle does not put on the blinker, causes the alerting apparatus 54 to output a voice message that "the forward vehicle is trying to change the course" or causes the character information that indicates the message to be displayed on the front windshield 110 or the display of the car navigation apparatus to put out an alert.

[Effect]

As described above, according to this embodiment, the control apparatus 100 recognizes the state of an occupant of the different vehicle and performs a process corresponding to the state, with the result that it is possible to prevent an accident of the own vehicle or the different vehicle. Specifically, by the control apparatus 100, the followings are achieved.

The driver of the own vehicle can grasp that the driver of the forward vehicle does not recognize the own vehicle, leading to prevention of an accident.

The driver of the own vehicle can grasp in advance that the person opens the door and gets out of the forward vehicle stopped, leading to prevention of an accident.

The driver of the own vehicle can grasp that the person is trying to open the window and put out a face or a hand from the forward vehicle, and can drive carefully.

The driver of the own vehicle can grasp that the driver of the forward vehicle performs inattentive driving/drink driving/drowsy driving and thus drive while being careful about the forward vehicle, leading to prevention of an accident.

In a case where it is detected that the driver of the forward vehicle performs drowsy driving, the driver of the forward vehicle is notified of the fact with horn or the like, leading to prevention of an accident.

The driver of the own vehicle can grasp a detailed operation of the driver of the forward vehicle which cannot be indicated by the blinker or the like of the forward vehicle, leading to prevention of an accident (it cannot be determine whether changing a traffic lane, turning right or left, U-turning only by the blinker, but, for example, if it is detected that the driver of the forward vehicle turns and watches the rear, there is a high possibility of U-turning).

The driver of the own vehicle can predict a subsequent driving operation even if the forward vehicle forgets to put on the blinker.

Modified Example

The present technology is not limited to the above embodiments, and can be variously modified without departing from the gist of the present disclosure.

Figure 13:
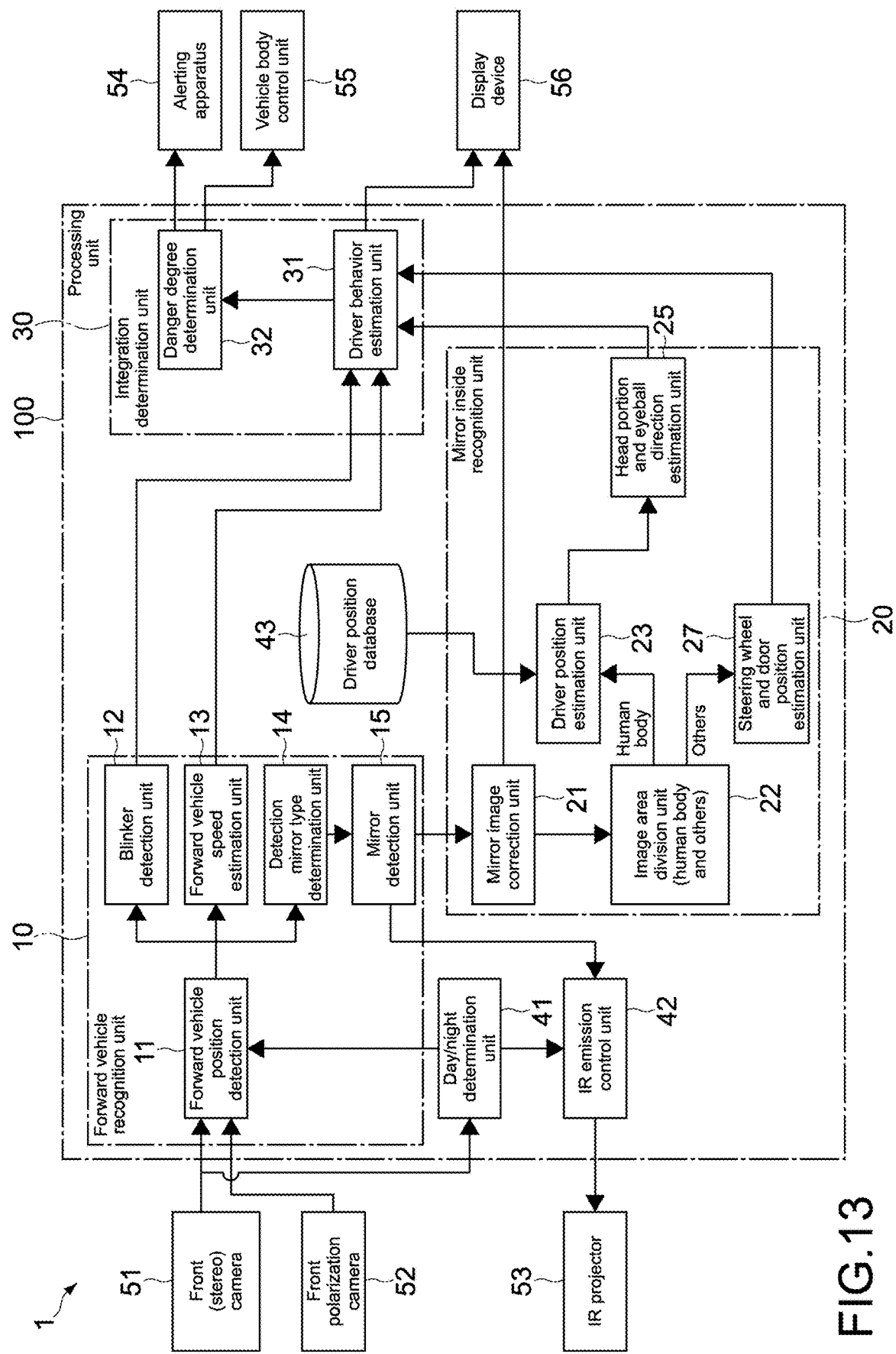
FIG. 13 A block diagram showing a configuration of an automobile including a control apparatus according to another embodiment of the present technology.

In the above embodiment, the control apparatus 100 switches the recognition target between the inner rearview mirror and the outer rearview mirror depending on the position of the forward vehicle. However, the recognition target may be only the outer rearview mirror or only the inner rearview mirror. FIG. 13 is a block diagram showing a configuration of the automobile 1 including the control apparatus 100 in a case where the recognition target is only the inner rearview mirror. As shown in the figure, as compared to the block diagram of FIG. 1, the control apparatus 100 shown in FIG. 13 does not include the upper body posture estimation unit 24 and the hand portion detail 26. This is because it is difficult to recognize an upper body posture and a detail of a hand of the driver of the forward vehicle from the mirror image of the inner rearview mirror.

In the above embodiment, the control apparatus 100 estimates the position of the driver of the forward vehicle and recognize the state and behavior of the driver. However, the control apparatus 100 may recognize a state and behavior of an occupant of the forward vehicle other than the driver, and in accordance with this, perform an alerting process or an automatic control process for the vehicle body.

In the above embodiment, in accordance with the state and behavior of the driver of the forward vehicle, the control apparatus 100 alerts the driver of the automobile 1 or the forward vehicle of the danger. However, the control apparatus 100 may put out an alert to a different vehicle excluding the automobile 1 and the forward vehicle (forward vehicle as the recognition target of the mirror).

In the above embodiment, the case where the present technology is applied to the outer rearview mirror or the inner rearview mirror of the automobile (four-wheel vehicle) is described. However, the present technology may be applied to a rearview mirror of a two-wheel vehicle. In this case, the own vehicle may be a two-wheel vehicle or a four-wheel vehicle. In a case where the own vehicle is a two-wheel vehicle, a display device may be a wearable display such as a transmission type head-mounted display that is configured integrally with a helmet of a driver of the own vehicle.

[Others]

It should be noted that the present technology can take the following configurations.

(1)

A control apparatus, including:

an input unit to which a pickup image of a camera provided to an own vehicle is input; and a control unit that detects a mirror provided to a different vehicle that exists in front of the own vehicle from the input pickup image, detects a person from a mirror image of the detected mirror, recognizes a state of the person from an image of the detected person, and performs an alerting process or a control process for the own vehicle to prevent an accident of the own vehicle or the different vehicle in accordance with the recognized state of the person.

(2)

The control apparatus according to (1) above, in which the control unit recognizes a part of a body of the person from the image of the detected person in the mirror image, recognizes a component of the different vehicle from an image excluding the person in the mirror image, and recognizes the state of the detected person on a basis of a relationship between the recognized part of the body and the recognized component.

(3)

The control apparatus according to (1) or (2) above, in which the control unit recognizes a state of the different vehicle from an image excluding the mirror in the input pickup image, and estimates a behavior of the person on a basis of the recognized state of the person and the state of the different vehicle.

(4)

The control apparatus according to (2) above, in which the control unit determines whether the detected person is a driver or not on a basis of the relationship between the recognized part of the body and the recognized component.

(5)

The control apparatus according to any one of (1) to (4) above, further including:

a storage unit that stores driver's seat information relating to a position of a driver's seat for each vehicle model, in which the control unit recognizes a vehicle model of the different vehicle from the pickup image, and estimates a position of a driver of the different vehicle on a basis of the recognized vehicle model and the stored driver's seat information.

(6)

The control apparatus according to any one of (1) to (5) above, in which in a case where it is detected from the pickup image that the different vehicle exists on a traffic lane different from the own vehicle, the control unit detects an outer rearview mirror provided to the different vehicle, and in a case where it is detected from the pickup image that the different vehicle exists on a same traffic lane as the own vehicle, the control unit detects an inner rearview mirror provided to the different vehicle.

(7)

The control apparatus according to any one of (1) to (6) above, in which the control unit controls an infrared light emission unit provided to the own vehicle to irradiate the mirror detected at night with infrared light.

(8)

The control apparatus according to any one of (1) to (7) above, in which the control unit recognizes the state of the person on a basis of the pickup image from which a reflection component caused due to window glass of the different vehicle is removed, the pickup image being input through a polarization camera provided to the own vehicle.

(9)

The control apparatus according to (1) above, in which in a case where the control unit detects that the different vehicle is in a stopped state from the pickup image, and detects that the person lays a hand on a door from a relationship between an image of the door in the mirror image and an image of the hand of the person, the control unit alerts a driver of the own vehicle that the person gets out of the different vehicle, or performs an alerting process of alerting a driver of the different vehicle of an approach by the own vehicle.

(10)

The control apparatus according to (4) above, in which in a case where the control unit detects that a state in which eyelids of the detected driver are closed for a first period or more occurs by a predetermined frequency or more, and a state in which a head portion of the driver is directed downward at a predetermined angle or more continues for a second period or more, the control unit alerts a driver of the own vehicle that the driver of the different vehicle is drowsing, or performs an alerting process of putting out an alert to the driver of the different vehicle.

(11)

The control apparatus according to (4) above, in which the control unit estimates a direction of a line of sight of the detected driver, and in a case where the estimated direction of the line of sight does not coincide with a direction of the mirror, the control unit performs an alerting process of putting out an alert that the driver of the different vehicle does not recognize the own vehicle.

(12)

The control apparatus according to (4) above, in which the control unit recognizes a hand of the detected driver and a blinker lever of the different vehicle from the mirror image, and in a case where the control unit detects that the driver lays the hand on the blinker lever, the control unit performs an alerting process of alerting a driver of the own vehicle that the driver of the different vehicle changes a course.

(13)

The control apparatus according to (4) above, in which the control unit generates an image that indicates the recognized state of the driver of the different vehicle, and controls a display control unit of the own vehicle to display the generated image in a superposed manner on a position corresponding to a driver's seat of the different vehicle on a front windshield of the own vehicle, which is capable of being visually confirmed by a driver of the own vehicle through the front windshield.

REFERENCE SIGNS LIST

1 . . . automobile (own vehicle)
10 . . . forward vehicle recognition unit
20 . . . mirror inside recognition unit
30 . . . integration determination unit
41 . . . day/night determination unit
42 . . . IR emission control unit
43 . . . driver position database
51 . . . front camera
52 . . . front polarization camera
53 . . . IR projector
54 . . . alerting apparatus
55 . . . vehicle body control unit
56 . . . display device
70 . . . door mirrors
80 . . . inner rearview mirror
100 . . . control apparatus
110 . . . front windshield
115 . . . driver image
120 . . . blinker lever F . . . forward vehicle
I . . . mirror image

The invention claimed is:
1. A control apparatus, comprising:
circuitry configured to function as:
an input unit to which a pickup image of a camera provided to an own vehicle is input; and
a control unit that detects a mirror provided to a different vehicle that exists in front of the own vehicle from the input pickup image, detects a person from a mirror image of the detected mirror, recognizes a state of the person from an image of the detected person, and performs an alerting process or a control process for the own vehicle to prevent an accident of the own vehicle or the different vehicle in accordance with the recognized state of the person,
wherein in a case where it is detected from the pickup image that the different vehicle exists on a traffic lane different from the own vehicle, the control unit detects an outer rearview mirror provided to the different vehicle, and in a case where it is detected from the pickup image that the different vehicle exists on a same traffic lane as the own vehicle, the control unit detects an inner rearview mirror provided to the different vehicle.

2. The control apparatus according to claim 1, wherein the control unit recognizes a part of a body of the person from the image of the detected person in the mirror image, recognizes a component of the different vehicle from an image excluding the person in the mirror image, and recognizes the state of the detected person on a basis of a relationship between the recognized part of the body and the recognized component.

3. The control apparatus according to claim 1, wherein the control unit recognizes a state of the different vehicle from an image excluding the mirror in the input pickup image, and estimates a behavior of the person on a basis of the recognized state of the person and the state of the different vehicle.

4. The control apparatus according to claim 2, wherein the control unit determines whether the detected person is a driver or not on a basis of the relationship between the recognized part of the body and the recognized component.

5. The control apparatus according to claim 1, further comprising:
a storage unit that stores driver's seat information relating to a position of a driver's seat for each vehicle model, wherein
the control unit recognizes a vehicle model of the different vehicle from the pickup image, and estimates a position of a driver of the different vehicle on a basis of the recognized vehicle model and the stored driver's seat information.

6. The control apparatus according to claim 1, wherein the control unit controls an infrared light emission unit provided to the own vehicle to irradiate the mirror detected at night with infrared light.

7. The control apparatus according to claim 1, wherein the control unit recognizes the state of the person on a basis of the pickup image from which a reflection component caused due to window glass of the different vehicle is removed, the pickup image being input through a polarization camera provided to the own vehicle.

8. The control apparatus according to claim 1, wherein in a case where the control unit detects that the different vehicle is in a stopped state from the pickup image, and detects that the person lays a hand on a door from a relationship between an image of the door in the mirror image and an image of the hand of the person, the control unit alerts a driver of the own vehicle that the person gets out of the different vehicle, or performs an alerting process of alerting a driver of the different vehicle of an approach by the own vehicle.

9. The control apparatus according to claim 4, wherein in a case where the control unit detects that a state in which eyelids of the detected driver are closed for a first period or more occurs by a predetermined frequency or more, and a state in which a head portion of the driver is directed downward at a predetermined angle or more continues for a second period or more, the control unit alerts a driver of the own vehicle that the driver of the different vehicle is drowsing, or performs an alerting process of putting out an alert to the driver of the different vehicle.

10. The control apparatus according to claim 4, wherein the control unit estimates a direction of a line of sight of the detected driver, and in a case where the estimated direction of the line of sight does not coincide with a direction of the mirror, the control unit performs an alerting process of putting out an alert that the driver of the different vehicle does not recognize the own vehicle.

11. The control apparatus according to claim 4, wherein the control unit recognizes a hand of the detected driver and a blinker lever of the different vehicle from the mirror image, and in a case where the control unit detects that the driver lays the hand on the blinker lever, the control unit performs an alerting process of alerting a driver of the own vehicle that the driver of the different vehicle changes a course.

12. The control apparatus according to claim 4, wherein the control unit generates an image that indicates the recognized state of the driver of the different vehicle, and controls a display control unit of the own vehicle to display the generated image in a superposed manner on a position corresponding to a driver's seat of the different vehicle on a front windshield of the own vehicle, which is capable of being visually confirmed by a driver of the own vehicle through the front windshield.

13. A control method, comprising:
detecting a mirror provided to a different vehicle that exists in front of an own vehicle from a pickup image input from a camera provided to the own vehicle;
detecting a person from a mirror image of the detected mirror;
recognizing a state of the person from an image of the detected person; and
performing an alerting process or a control process for the own vehicle to prevent an accident of the own vehicle or the different vehicle in accordance with the recognized state of the person; and
in a case where it is detected from the pickup image that the different vehicle exists on a traffic lane different from the own vehicle, detecting an outer rearview mirror provided to the different vehicle, and in a case where it is detected from the pickup image that the different vehicle exists on a same traffic lane as the own vehicle, detecting an inner rearview mirror provided to the different vehicle.

14. At least one non-transitory computer-readable storage medium storing processor-executable instructions that, when executed by at least one processor, cause the at least one processor to execute the steps of:
- detecting a mirror provided to a different vehicle that exists in front of an own vehicle from a pickup image input from a camera provided to the own vehicle;
- detecting a person from a mirror image of the detected mirror;
- recognizing a state of the person from an image of the detected person;
- performing an alerting process or a control process for the own vehicle to prevent an accident of the own vehicle or the different vehicle in accordance with the recognized state of the person; and
- in a case where it is detected from the pickup image that the different vehicle exists on a traffic lane different from the own vehicle, detecting an outer rearview mirror provided to the different vehicle, and in a case where it is detected from the pickup image that the different vehicle exists on a same traffic lane as the own vehicle, detecting an inner rearview mirror provided to the different vehicle.

* * * * *